US010528497B2

(12) United States Patent
Hansing et al.

(10) Patent No.: US 10,528,497 B2
(45) Date of Patent: Jan. 7, 2020

(54) BUS ARRANGEMENT AND METHOD FOR OPERATING A BUS ARRANGEMENT

(71) Applicant: EATON INTELLIGENT POWER LIMITED, Dublin (IE)

(72) Inventors: Matthias Hansing, Bad Honnef (DE); Franz Heller, Sankt Augustin (DE); Peter Thiessmeier, Wachtberg (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/781,523

(22) PCT Filed: Dec. 6, 2016

(86) PCT No.: PCT/EP2016/079823
§ 371 (c)(1),
(2) Date: Jun. 5, 2018

(87) PCT Pub. No.: WO2017/097731
PCT Pub. Date: Jun. 15, 2017

(65) Prior Publication Data
US 2018/0276153 A1  Sep. 27, 2018

(30) Foreign Application Priority Data
Dec. 7, 2015  (DE) ........................ 10 2015 121 290

(51) Int. Cl.
G06F 13/20  (2006.01)
G06F 13/40  (2006.01)
(52) U.S. Cl.
CPC .......... G06F 13/20 (2013.01); G06F 13/4068 (2013.01)

(58) Field of Classification Search
CPC .................................................... G06F 3/0482
See application file for complete search history.

(56) References Cited

U.S. PATENT DOCUMENTS 8,473,656 B2   6/2013  Kuschke
8,554,978 B2  10/2013  Buesching et al.
(Continued)

FOREIGN PATENT DOCUMENTS

DE   102006050135 A1   4/2008
DE   102008050102 A1   4/2010
(Continued)

Primary Examiner — Henry Tsai
Assistant Examiner — Juanito Borromeo
(74) Attorney, Agent, or Firm — Leydig, Voit & Mayer, Ltd.

(57) ABSTRACT

A bus arrangement includes a first subscriber, which includes a base module and a first number N of modules; a second subscriber; a coordinator, which includes a first bus terminal and a second bus terminal; and a bus that couples the first bus terminal with the first subscriber and the second subscriber. The coordinator is configured such that, in a configuration phase (K), it sends the first subscriber a first bus telegram for requesting information, the first subscriber being configured to transmit the first number N to the coordinator. The coordinator is configured to receive a fieldbus telegram via the second bus terminal and to convert the field bus telegram into a second bus telegram that is directed to the base module or to a module from the first number N of modules and to transmit the second bus telegram via the first bus terminal.

9 Claims, 3 Drawing Sheets

(56) References Cited

U.S. PATENT DOCUMENTS

| | | | |
|---|---|---|---|
| 8,769,072 B2 * | 7/2014 | Smith | H04L 12/40195 709/208 |
| 8,886,786 B2 * | 11/2014 | Hahniche | G05B 19/4184 700/79 |
| 2008/0162738 A1 | 7/2008 | Apel et al. | |
| 2009/0187691 A1 | 7/2009 | Huck et al. | |
| 2010/0146182 A1 | 6/2010 | Gutekunst et al. | |
| 2015/0143008 A1 | 5/2015 | Feinaeugle et al. | |
| 2015/0169493 A1 | 6/2015 | Gehrke | |
| 2015/0331413 A1 | 11/2015 | Schneid et al. | |

FOREIGN PATENT DOCUMENTS

| | | |
|---|---|---|
| DE | 102010020446 A1 | 11/2011 |
| DE | 102011006590 A1 | 5/2012 |

* cited by examiner

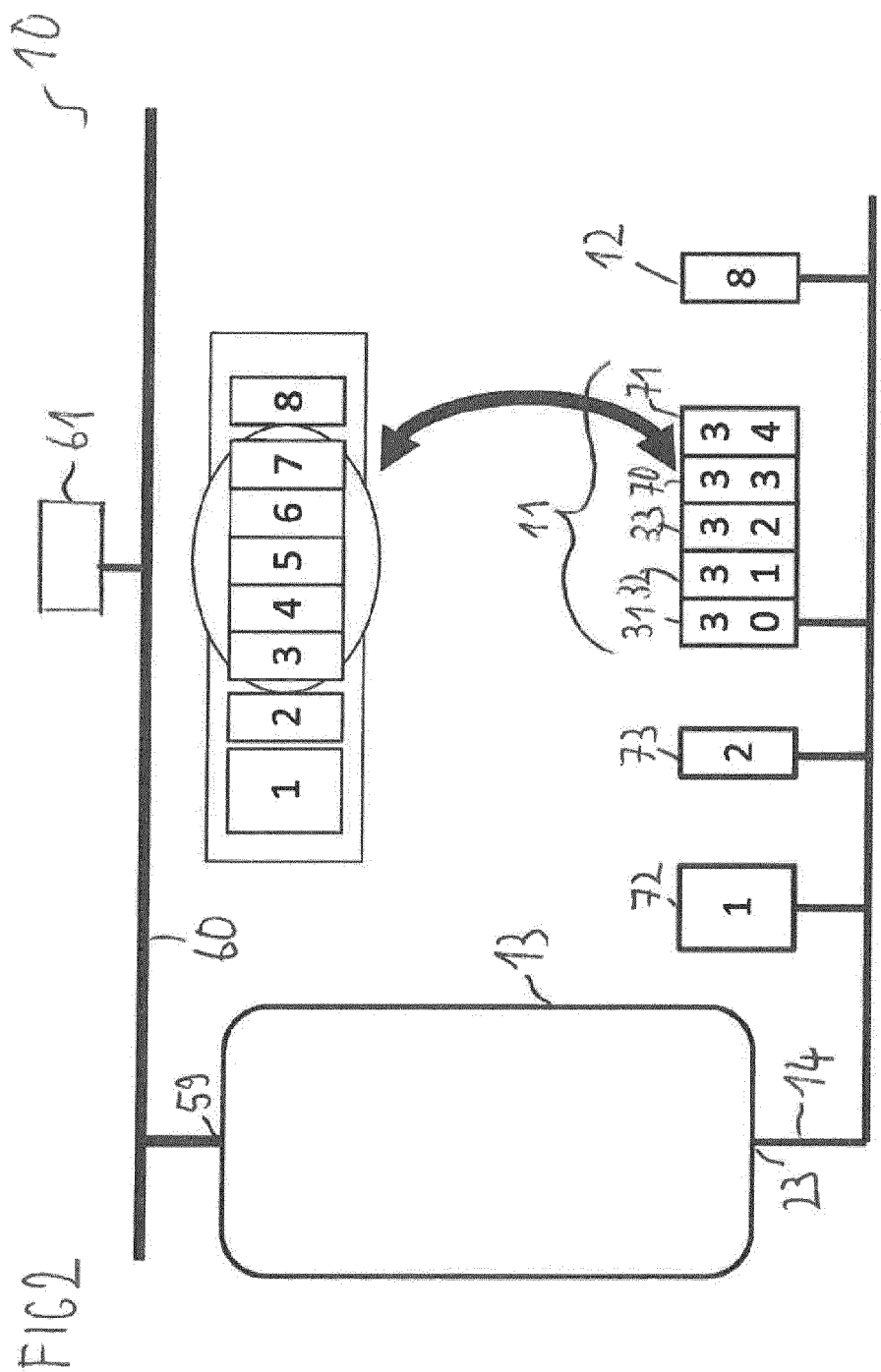

| Slot-Nummer | Teilnehmer-Adresse | Modul-nummer |
|---|---|---|
| 1 | 1 | 0 |
| 2 | 1 | 1 |
| 3 | 1 | 2 |
| 4 | 4 | |

| Slot-Nummer | Teilnehmer-Adresse | Modul-nummer |
|---|---|---|
| 1 | 1 | |
| 2 | 2 | |
| 3 | 3 | 0 |
| 4 | 3 | 1 |
| 5 | 3 | 2 |
| 6 | 3 | 3 |
| 7 | 3 | 4 |
| 8 | 8 | |

BUS ARRANGEMENT AND METHOD FOR OPERATING A BUS ARRANGEMENT

CROSS-REFERENCE TO PRIOR APPLICATIONS

This application is a U.S. National Stage Application under 35 U.S.C. § 371 of International Application No. PCT/EP2016/079823 filed on Dec. 6, 2016, and claims benefit to German Patent Application No. DE 10 2015 121 290.0 filed on Dec. 7, 2015. The International Application was published in German on Jun. 15, 2017 as WO 2017/097731 A1 under PCT Article 21(2).

FIELD

The present invention relates to a bus arrangement and to a method for operating a bus arrangement.

BACKGROUND

A bus arrangement can be used in automation technology, for example. A bus arrangement typically has one coordinator and a plurality of subscribers. A bus connects the subscribers to the coordinator. The subscribers can be embodied as actuators or sensors. The actuators can be switching devices such as contactors, motor starters and circuit breakers, command devices and frequency converters.

SUMMARY

In an embodiment, the present invention provides a bus arrangement that includes a first subscriber, which includes a base module and a first number N of modules; a second subscriber; a coordinator, which includes a first bus terminal and a second bus terminal; and a bus that couples the first bus terminal with the first subscriber and the second subscriber. The coordinator is configured such that, in a configuration phase (K), it sends the first subscriber a first bus telegram for requesting information, the first subscriber being configured to transmit the first number N to the coordinator. The coordinator is configured to receive a fieldbus telegram via the second bus terminal and to convert the field bus telegram into a second bus telegram that is directed to the base module or to a module from the first number N of modules and to transmit the second bus telegram via the first bus terminal

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 1 and 2 illustrate exemplary embodiments of a bus arrangement;

DETAILED DESCRIPTION

Figure 1:
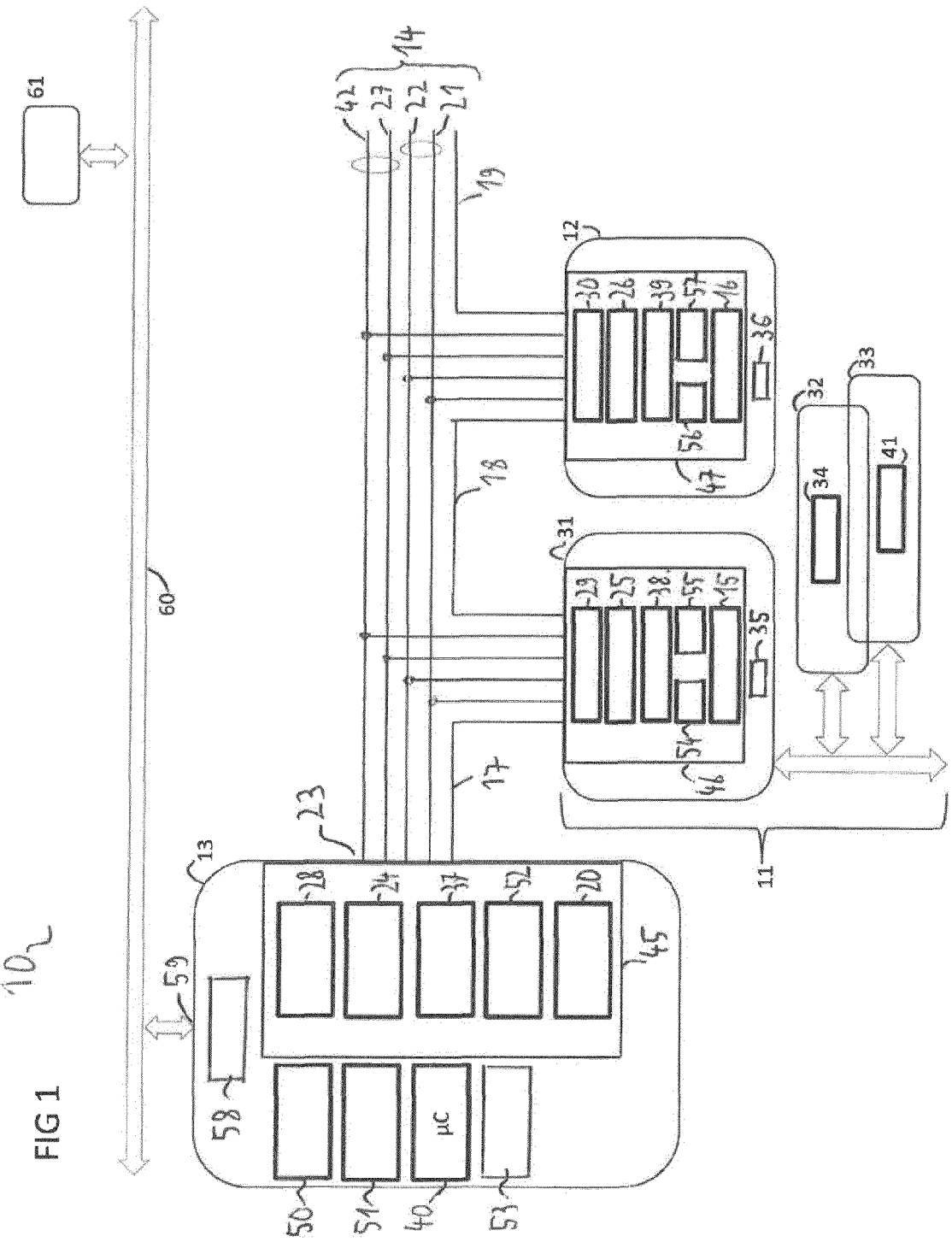

Embodiments of the present invention provide a bus arrangement and a method for operating a bus arrangement in which a module of a subscriber can be addressed.

In one embodiment, a bus arrangement includes a first subscriber including a base module and a first number N of modules, a second bus subscriber, a coordinator including a first and a second bus terminal, and a bus that couples the first bus terminal with the first and the second subscriber. The bus can be embodied as a linear bus. The coordinator is designed (configured) to receive a fieldbus telegram via the second bus terminal and to convert it into a bus telegram that is directed to the base module or to a module from the first number N of modules and to transmit it via the first bus terminal.

The bus telegram is advantageously addressed to the module or the base module. Using the information in the fieldbus telegram, the coordinator determines to which subscriber and to which module or base module of the subscriber the bus telegram is to be addressed. The first number N is greater than zero.

In one embodiment, each module of the first number N of modules is addressable. The coordinator can direct a bus telegram to each module of the first number of modules. The coordinator may optionally direct the bus telegram to the base module or to a module from the first number N of modules. Optionally, the coordinator can also direct the bus telegram to the second or another subscriber.

In one embodiment, the first subscriber has a first subscriber address. The second subscriber has a second subscriber address. The first number N of modules has a first number N of module numbers. The base module can also have a module number. The coordinator includes a memory. The memory can be nonvolatile. The coordinator identifies a slot number from the fieldbus telegram, determines the first subscriber address and the module number associated with the slot number using the slot number and the information stored in the memory, and addresses the bus telegram to the first subscriber address and the module number. Advantageously, the fieldbus telegram can be free of the specification of a module number. The fieldbus telegram can contain only slot numbers for addressing subscribers, base modules, and modules.

In one embodiment, the coordinator transmits a fieldbus telegram via the second bus terminal, which includes a slot number and data made available by a module from the number N of modules or the base module of the first subscriber. The coordinator determines the slot number specified in the fieldbus telegram using the information stored in the memory, the first subscriber address, and the module number of the module or base module associated with the slot number.

The coordinator can be embodied as a transfer point (gateway).

In one embodiment, in a configuration mode (phase), the coordinator sends the first subscriber a bus telegram requesting information, and the first subscriber transmits the first number N, that is the numerical value of the first number N, to the coordinator. The first subscriber can include a first nonvolatile memory in which the first number N is stored. The first subscriber makes the value of the first number N stored in the first nonvolatile memory available to the coordinator.

In one embodiment, a module from the first number of modules in each case includes a configurable and/or parameterizable functional unit or is embodied as such. The first subscriber thus includes the first number N of configurable and/or parameterizable functional units. Likewise, the second subscriber can include a configurable and/or parameterizable functional unit.

In one embodiment, the base module includes a respective configurable and/or parameterizable functional unit or is embodied as such. The first subscriber thus includes N+1 functional units.

In one embodiment, a functional unit is embodied as a structural unit or as a program module, or both. The structural unit can be a physical structural unit that is mechanically and electrically connected to additional structural units in order to instantiate the first subscriber. The first subscriber can have a processor core in which several program modules run. The various program modules have different tasks that can be independent of one other.

In one embodiment, a functional unit includes a structural unit and a program module that controls the structural unit or stores data of the structural unit.

In one embodiment, each module from the first number of modules includes a functional unit from a group that includes an actuator unit, switchgear unit, control device unit, command device unit, signaling device unit, control unit, frequency converter unit, meter unit, and sensor unit. A switchgear unit can be embodied as a contactor unit, motor starter unit, or circuit breaker unit, for example.

In one embodiment, the base module includes a functional unit from a group that includes an actuator unit, switchgear unit, control device unit, command device unit, signaling device unit, control unit, frequency converter unit, meter unit, and sensor unit. A switchgear unit can be embodied as a contactor unit, motor starter unit, or circuit breaker unit, for example. The first subscriber includes the first number N plus 1 of functional units from this group. The second subscriber can also include a functional unit from the abovementioned group.

In one embodiment, the base module includes a functional unit from a group that includes an actuator unit, switchgear unit, control device unit, command device unit, signaling device unit, control unit, frequency converter unit, meter unit, and sensor unit. A switchgear unit can be embodied as a contactor unit, motor starter unit, or circuit breaker unit, for example.

In one embodiment, the base module of the first subscriber is directly connected to the bus. The modules from the first number of modules of the first subscriber are free of a direct connection to the bus. The communication of the coordinator with the modules from the first number N of modules takes place exclusively via the base module of the first subscriber that is connected directly to the bus.

In one embodiment, in a configuration phase, the coordinator communicates a first subscriber address to the first subscriber. In the configuration phase, the coordinator can communicate a second subscriber address to the second subscriber.

In one embodiment, the first subscriber is located between the coordinator and the second subscriber on the bus. The second subscriber can be subsequently connected to the first subscriber on the bus.

In one embodiment, the coordinator determines the second subscriber address according to the following rule: second subscriber address≥first subscriber address+N+1, where N is the first number of modules of the first subscriber.

In one embodiment, the first number N of modules are assigned the first number N of slot numbers. The base module can also be assigned a slot number. The assignment of the modules and of the base module to the slot numbers is stored in the memory of the coordinator. The memory can be nonvolatile. The slot numbers are consecutive integers. The second subscriber is assigned the slot number immediately following the highest slot number from the first number N of modules, or a higher slot number.

In one embodiment, the subscriber address of the second subscriber is identical to the slot number corresponding thereto. This facilitates the programming of the controller.

In one embodiment, the subscriber addresses do not occupy all consecutive numbers. The coordinator does not use N−1 values between the first and second subscriber addresses.

In one embodiment, the bus includes a first signal line that couples the first subscriber and the coordinator, and at least one bus line that connects the coordinator to the first and second subscribers. In the configuration phase, the coordinator activates the first subscriber via the first signal line and transmits a bus telegram containing the first subscriber address via the at least one bus line. The first subscriber stores the first subscriber address in a first volatile memory of the first subscriber. Because exactly one subscriber is activated—namely the first subscriber, in this case—only this subscriber stores the subscriber address provided via the at least one bus line. Such a bus telegram that is sent to all subscribers via the bus line can also be referred to as a broadcast message. Since the first subscriber now stores the first subscriber address in the first volatile memory, it can be addressed by means of the first subscriber address. The activation of the first subscriber can be done directly by the coordinator or, if further subscribers are arranged between the coordinator and the first subscriber, via the subscriber preceding the first subscriber.

In one embodiment, the bus includes a second signal line that connects the second subscriber to the first subscriber. The at least one bus line connects the coordinator to the first and the second subscriber.

In one embodiment, the first subscriber activates the second subscriber in the configuration phase via the second signal line. The coordinator transmits a bus telegram containing the second subscriber address to the first and the second subscriber via the at least one bus line. The second subscriber stores the second subscriber address in a second volatile memory of the second subscriber. Since only the second subscriber is activated during the period in which the bus telegram is sent with the second subscriber address, only the second subscriber accepts the second subscriber address into its volatile memory.

The first and the second volatile memory of the first and the second subscriber can be embodied as random access memory, abbreviated to RAM, or flash memory, for example. The RAM can be embodied as dynamic random access memory, abbreviated to DRAM, or static random access memory, abbreviated to SRAM. The first and the second volatile memory are designed to lose their memory contents during the shut-down phase.

The second subscriber can consist exclusively of one base module.

In one embodiment, the second subscriber has a second nonvolatile memory in which a second number M of modules is stored. If the second subscriber consists exclusively of the base module, then the second number M has the value 0. The first and the second nonvolatile memory can for example be permanent memories such as a read only memory, abbreviated to ROM, a programmable read only memory, abbreviated to PROM, or a one-time programmable module, or OTP module for short.

In one embodiment, the memory of the coordinator is nonvolatile. The memory stores the first number N and possibly the second number M remanently. The memory of the coordinator is thus designed to continue to store the first number N and possibly the second number M even if the power supply of the coordinator is interrupted. The memory can be a semi-permanent memory such as an electrically erasable programmable read only memory, abbreviated to EEPROM, or a flash EEPROM. The coordinator can have an additional memory that is volatile.

In one embodiment, the first signal line connects the first subscriber to the coordinator. The first subscriber and the coordinator are thus directly and permanently connected to one other via the first signal line.

In one embodiment, the second subscriber is directly and permanently connected to the first subscriber via the second signal line. The second subscriber is not directly connected to the first signal line. The second subscriber is exclusively coupled with the first signal line via the first subscriber. Accordingly, the coordinator is not directly connected to the second signal line. The coordinator is coupled with the second signal line via the first subscriber.

The coordinator as well as the first subscriber and the second subscriber are directly connected to the at least one bus line.

In one embodiment, the at least one bus line of the bus is embodied as exactly one bus line.

In an alternative embodiment, the bus has the at least one bus line as well as an additional bus line. Thus, the bus has exactly two bus lines, namely a first and a second bus line. The first and the second bus line can be operated according to the TIA/EIA-485 A interface standard, also called the EIA-485 or RS-485 interface standard.

In one embodiment, the bus arrangement includes one or more additional subscribers, which are connected to the at least one bus line. An additional subscriber can be connected to the second subscriber via a third signal line. However, the additional subscriber(s) can also be arranged between the coordinator and the first subscriber, for example.

In one embodiment, the configuration phase is part of an operating phase. The operating phase is followed by a shut-down phase and then another operating phase, which begins with a restart phase. Subsequently, additional operating phases, each of which has a restart phase at the beginning, can alternate with shut-down phases. The restart phase thus follows the configuration phase.

In one embodiment, the coordinator and subscribers form a series connection or chain that can be referred to as a daisy chain. The coordinator and the subscribers thus form a daisy-chain arrangement or a daisy-chain bus. The coordinator and the subscribers are connected in series via the signal lines. The first subscriber can be connected directly to the coordinator. The other subscribers are each connected to their predecessors.

In one embodiment, the base module of the first subscriber includes a transceiver. The transceiver is coupled with the first volatile memory and the first nonvolatile memory of the first subscriber. The modules from the first number N of modules of the first subscriber are transceiver-free. Moreover, the second subscriber can include a transceiver, which can be coupled with the second volatile memory and the second nonvolatile memory. The transceivers can be embodied as bus transceivers. The transceivers can be designed for the RS-485 interface standard.

In one embodiment, in an operating phase—after the configuration phase or after the restart phase, for example—the coordinator transmits a bus telegram containing the first subscriber address and data via the at least one bus line to all subscribers and thus to the first and the second subscriber as well. The transceiver of the first subscriber is designed to recognize the first subscriber address and the module number, so that the module or the base module of the first subscriber processes the data in the bus telegram with the transmitted module number or is set according to the data. The second and the additional subscribers can recognize the second subscriber address and the additional subscriber addresses, so that the second or additional subscribers process the data in the bus telegram.

The bus arrangement can also be referred to as a bus system. The bus arrangement can carry out an addressing procedure by daisy chain. The daisy chain stands for the geographical position here. Each time the bus assembly is first powered up, a daisy-chain procedure is used. All subscribers on the bus are addressed by the coordinator with an ascending address sequence. The addressing procedure ends at the first missing subscriber or at the last possible subscriber to be addressed. The number of modules of each addressed subscriber is remanently stored by the coordinator together with its subscriber address.

In one embodiment, a method for operating a bus arrangement includes the following steps: The coordinator receives a fieldbus telegram via a second bus terminal of the coordinator. The coordinator converts the fieldbus telegram into a bus telegram and transmits it via a first bus terminal of the coordinator. In the process, a bus couples the first bus terminal with a first and a second subscriber. The first subscriber includes a base module and a first number N of modules. The coordinator directs the bus telegram to a module from the first number N of modules or the base module.

Since the coordinator can address the bus telegram to the module from the first number N of modules, it is possible for data and/or commands to be transmitted from the fieldbus telegram to the module. The first number N is greater than zero. The first number can also be greater than one or two.

Advantageously, several functions can be implemented with one subscriber, with each individual function in the control system again being given a clear assignment in the image address. The first, second, and additional subscribers can also be referred to as bus subscribers.

The first subscriber is embodied as a modular bus subscriber. The subfunctions of the modular bus subscriber are mapped again as bus subscriber functions on the control level.

The coordinator is embodied as a fieldbus gateway. The bus can also be referred to as a sub-bus. The coordinator is a modular fieldbus subscriber that can represent a bus line with its subscribers. Bus subscriber addresses are mapped on the fieldbus as slot numbers of a modular fieldbus subscriber. Additional sub-addressing levels can no longer simply be mapped transparently in most fieldbuses. However, a modular bus subscriber requires exactly this additional sublevel. Therefore, in the coordinator that is embodied as a fieldbus gateway, the fieldbus slot addressing of the fieldbus subscriber from the control level or fieldbus level for the submodules of a modular bus subscriber is translated into bus slot addressing, thus enabling these sub-bus modules to be processed transparently at the control level like bus subscriber modules.

Slot numbers in the modular fieldbus subscriber become sub-bus subscriber addresses and, optionally, slot numbers of a sub-bus subscriber, and vice versa.

Fieldbus subscriber addresses are mapped on the sub-bus as slot numbers (submodules) of a modular sub-bus subscriber.

Submodules are treated like normal sub-bus subscribers during parameterization/configuration.

The coordinator has the function of a gateway between the fieldbus and the bus. In the target configuration of the coordinator, the projected parameter and configuration data for the sub-bus submodules are treated as for a sub-bus standard subscriber and stored remanently.

Sub-bus addresses correspond to fieldbus slot numbers of a modular fieldbus subscriber. For modular sub-bus subscribers, the sub-bus slot number is calculated from the sub-bus address plus the sub-bus slot number, such as the module number, for instance.

Each sub-bus subscriber module is mapped on the fieldbus level as a bus subscriber slot. Startup parameters, startup configuration data, diagnostics, and other acyclic data exchanges are transmitted separately for each sub-bus subscriber module. In the sub-bus protocol, all acyclic protocol data units, abbreviated as PDUs, enable module addressing via slot numbers. With the number of existing modules in the modular sub-bus subscriber, the address of the subsequent subscriber shifts on the sub-bus, thus enabling all subscribers and slot modules to be mapped at the field bus level. The maximum number of admissible sub-bus subscribers is implicitly reduced with the sum of all modules. This also has the added benefit of keeping existing resources in the fieldbus gateways that support sub-bus modules the same.

The mapping of a modular subscriber can be performed as follows: Together with its subscribers, the coordinator, which functions as a fieldbus gateway, is a modular fieldbus subscriber whose submodules are each subscribers. Subscriber addresses are mapped as slot numbers in the fieldbus subscriber. The submodules of a modular subscriber (second sublevel) are mapped for the fieldbus as subscribers. This mapping is converted in the coordinator.

A gateway extension can be implemented in this way: The coordinator must recognize the modular subscriber and know how many slots it has. The process data lengths for each slot must also be known in order for the status nibble/byte to be formed (e.g. diagnostics). Subscriber addresses correspond to fieldbus slot numbers of a modular fieldbus subscriber. In the case of modular subscribers, the fieldbus slot number is calculated from the subscriber address plus the subscriber slot number—that is, the module number.

The invention is explained below in greater detail on the basis of several embodiments with reference to the drawings. Components or functional units having the same function and/or effect bear the same reference signs. Insofar as components or functional units have corresponding functions, a description thereof will not be repeated in relation to each one of the figures that follow.

FIG. 1 shows an exemplary embodiment of a bus arrangement 10 that includes a first and a second subscriber 11, 12, a coordinator 13, and a bus 14. The coordinator 13 is connected to the first and the second subscriber 11, 12 via a first bus terminal 23 of the bus 14. The first and the second subscriber 11, 12 each have a processor core 15, 16. The bus 14 includes a first signal line 17, which connects a terminal of the coordinator 13 to a terminal of the first subscriber 11 and thereby connects to a terminal of the processor core 15 of the first subscriber 11, for example. The first signal line 17 is not connected directly to the second or an additional subscriber 12. For the sake of clarity, the lines in the coordinator 13 and in the first and second subscribers 11, 12 are not shown.

Furthermore, the bus 14 includes a second signal line 18, which connects a terminal of the first subscriber 11 to a terminal of the second subscriber 12. For example, the second signal line 18 connects the processor core 15 of the first subscriber 11 to the processor core 16 of the second subscriber 12. In addition, the bus 14 may include a third signal line 19 connecting a terminal of the second subscriber 12 to a third subscriber. The coordinator 13 includes a processor core 20, which is connected to the first signal line 17. The bus 14 is embodied as a linear bus. The bus 14 can be embodied as a serial bus. The coordinator 13 can be embodied as a master. The subscribers 11, 12 can be embodied as slaves. Each processor core 15, 16, 20 can be embodied as a microprocessor.

The processor core 20 of the coordinator 13 is connected to the first signal line 17 via a signal line circuit 37 of the coordinator 13. Furthermore, the processor core 15 of the first subscriber 11 is connected to the first and the second signal line 17, 18 via a signal line circuit 38 of the first subscriber 11. The processor core 16 of the second subscriber 12 is connected to the second and, if present, also to the third signal line 18, 19 via a signal line circuit 39 of the second subscriber 12.

Moreover, the bus 14 includes at least one bus line 21 that connects the coordinator 13 to all subscribers and thus to the first and the second subscriber 11, 12. A signal on the at least one bus line 21 reaches all subscribers 11, 12. The bus 14 may include an additional bus line 22 connecting the coordinator 13 to all subscribers 11, 12. The at least one bus line 21 and the additional bus line 22 can also be referred to as the first and the second bus line. The coordinator 13 includes a transceiver 24 that couples the processor core 20 with the first and the second bus line 21, 22. The first and the second subscriber 11, 12 also each include a transceiver 25, 26 with terminals that are connected to the first and the second bus line 21, 22. In the first and the second subscriber 11, 12, the transceiver 25, 26 is respectively coupled with the processor core 15, 16. The first and the second bus line 21, 22 as well as the transceivers 24 to 26 of the coordinator 13 and of the subscribers 11, 12 can be embodied according to the RS 485 standard. The transceivers 24 to 26 of the coordinator 13 and of the subscribers 11, 12 can be embodied as transmit and receive transceivers and designed for half-duplex operation. The first to the third signal lines 17, 18, 19 form a daisy chain. Moreover, the coordinator 13 is connected directly to all subscribers 11, 12 via the at least one bus line 21 and the additional bus line 22.

In addition, the bus 14 includes a supply line 27 that connects a power supply 28 of the coordinator 13 to a power supply 29 of the first subscriber 11 and a power supply 30 of the second subscriber 12. Each power supply 28, 29, 30 can be embodied as a voltage regulator.

Furthermore, the first and the second subscriber 11, 12 can each include a functional unit 35, 36. The functional unit 35 of the first subscriber 11 is coupled with the processor core 15 of the first subscriber 11. The same applies to the second subscriber 12.

Furthermore, the bus 14 includes a reference potential line 42 that connects a reference potential terminal of the coordinator 13 to reference potential terminals of the first and the second subscriber 11, 12. The power supply line 27 and the reference potential line 42 serve to supply power to the subscribers 11, 12 through the coordinator 13.

Moreover, the coordinator 13 includes a memory 53 that is connected to the processor core 20 or microcontroller 40 of the coordinator 13. The memory 53 can be embodied as a nonvolatile memory. Furthermore, the coordinator 13 includes a volatile memory 52. The first subscriber 11 includes a first volatile memory 54 and a first nonvolatile memory 55 that can be connected to the transceiver 25. The second subscriber 12 includes a second volatile memory 56 and a second nonvolatile memory 57 that can be connected to the transceiver 26. The volatile memories 52, 54, 56 can each be embodied as random access memory, abbreviated as RAM, or flash memory.

The first subscriber 11 includes a base module 31 as well as a first and a second module 32, 33. The base module 31 of the first subscriber 11 includes the circuit components used for communication with the coordinator 13, such as the transceiver 25, the signal line circuit 38, and the processor core 15. The base module 31 further includes the first volatile memory 54 and the first nonvolatile memory 55. In addition, the base module 31 can include the functional unit 35. Moreover, the base module 31 may include the power supply 29.

The first module 32 of the first subscriber 11 includes an additional functional unit 34. The additional functional unit 34 is coupled with the processor core 15 of the base module 31. The additional functional unit 34 can be connected to the power supply 29 of the base module 31. The second module 33 includes an additional functional unit 41. The additional functional unit 41 can be connected to the voltage supply 29 of the base module 31. The connections of the base module 31 to the first and the second module 32, 33 can be achieved via a module bus 43 or via lines.

In the example shown in FIG. 1, the second subscriber 12 includes exactly one module, namely an additional base module. The second subscriber 12 therefore does not have a modular construction. The second subscriber 12 consists exclusively of the additional base module. Therefore, the base module of the second subscriber 12 is explained in the explanations of the second subscriber 12. The second subscriber 12 is embodied analogously to the base module 31 of the first subscriber 11.

The base module 31, the modules 32, 33, and the second subscriber 12 can each be embodied as a measuring device, sensor, or actuator. The actuator can be embodied as a switching device, control device, command device, signaling device, control unit (controller), or frequency converter. The functional unit 34, 35, 41 of the base module 31 and two modules 32, 33 can each be a unit from a group that includes an actuator unit (actuator), switchgear unit (switchgear), control device unit (device controller), command device unit (device commander), signaling device unit (signaler), control unit (controller), frequency converter unit (frequency converter), meter unit (meter), and sensor unit (sensor). The functional unit 36 of the second subscriber 12 can be embodied like the functional unit 34, 35, 41 of the base module 31 and of the first and the second module 32, 33.

The coordinator 13 includes an integrated circuit 45, which can be embodied as an ASIC. The integrated circuit 45 can include the power supply 28, the transceiver 24, the signal line circuit 37, the volatile memory 52, and the processor core 20. The base module 31 of the first subscriber 11 further includes an integrated circuit 46 that can be embodied as an ASIC. The integrated circuit 46 of base module 31 can include the power supply 29, the transceiver 25, the signal line circuit 38, the first volatile memory 54, the first nonvolatile memory 55, and the processor core 15. Moreover, the second subscriber 12 includes an integrated circuit 47, which can be embodied as an ASIC. The integrated circuit 47 of the second subscriber 12 can include the power supply 30, the transceiver 26, the signal line circuit 39, the second volatile memory 56, the second nonvolatile memory 57, and the processor core 16.

The coordinator 13 includes an additional transceiver 58, which couples a second bus terminal 59 of the coordinator 13 with the microcontroller 40 of the coordinator 13. Furthermore, the bus arrangement 10 includes a field bus 60, which is connected to the second bus terminal 59. The coordinator 13 can be a gateway, router, or switch. The bus arrangement 10 includes a controller 61, which is connected to the field bus 60. The coordinator 13 has an oscillator 50. The oscillator 50 can be embodied as an RC oscillator. The oscillator 50 can be used for time control. The coordinator 13 can have an additional memory 51 that is embodied as RAM or flash memory.

The bus 14 is embodied as a ribbon cable or round cable. According to FIG. 1, the bus 14 can consist of five wires, for example. Alternatively, the bus 14 can have a different number of wires, e.g. eight wires.

The first subscriber 11 has a first subscriber address and the second subscriber 12 has a second subscriber address. The first and the second module 32, 33 have a first and a second module number. The base module 31 can have an additional module number. The two modules 32, 33 are numbered consecutively. The two modules thus bear the numbers 1 and 2. The base module 31 can have the module number 0. The first subscriber 11 has the first number N of modules 32, 33. In the embodiment shown in FIG. 1, the first number N is equal to 2. The second subscriber address is calculated by the coordinator 13 according to the following rule: second subscriber address=first subscriber address+N+1.

In the embodiment according to FIG. 1, the second subscriber address is thus equal to the first subscriber address plus 3. Since the first subscriber 11 according to FIG. 1 is connected directly to the coordinator 13 via the first signal line 17, the first subscriber 11 typically has the number 1 as the first subscriber address. The second subscriber 12 thus has the number 4 as the second subscriber address.

The modules 31 to 33—that is, the base module 31 and the first and the second module 32, 33—can be uniquely addressed by means of the subscriber address and their module numbers. That is to say, the first module 32 has the first subscriber address, namely 1, and the first module number, namely also 1 or, alternatively, 3.1. By contrast, the second module 33 has the first subscriber address, namely 1, and the second module number, namely 2 or, alternatively, 3.2. The base module 31 can have the first subscriber address, namely 1, and an additional module number, namely 0 or, alternatively, 3.0.

The controller 61 can send a fieldbus telegram via the fieldbus 60 and the second bus terminal 59 to the coordinator 13. The coordinator 13 converts the fieldbus telegram into a bus telegram and outputs it via the first bus terminal 23. The controller 61 directs the fieldbus telegram to a slot number of the coordinator 13. The coordinator 13 recognizes the slot number and addresses the bus telegram in accordance with the information present in the memory 53. Depending on the slot number, the coordinator addresses one of the subscribers 11, 12 to the subscriber address and, if the subscriber to be addressed has one or more modules, to the module number of the subscriber to be addressed.

The base module 31 or one of the modules 32, 33 can have a functional unit 34, 35, 41, for example, which includes a sensor. The data measured by this sensor can be transmitted to the controller 61, for example. For this purpose, the data from this module of the first subscriber 11 are transmitted to the coordinator 13. The coordinator 13 generates a fieldbus telegram for the controller 61 that has the data transmitted by the module and a slot number as a source. The coordinator 13 forms the slot number from the subscriber address and the module number with the aid of the allocation table stored in the memory 53. Individual modules of a subscriber and non-modular subscribers thus can transmit data via the coordinator 13 to the controller 61 and receive data and/or commands from the controller 61 via the coordinator 13.

FIG. 2 shows an exemplary embodiment of the bus arrangement 10, which is a development of the embodiment shown in FIG. 1. The fieldbus 60 can be embodied as a Profibus DP, for example. For the sake of example, FIG. 2 shows the bus system 10 and its mapping on the control level (e.g. Profibus DP 60 on the bus 14). In this embodiment, the first subscriber 11 has the base module 31 and four modules 32, 33, 70, 71. The module numbers begin with the number 0, for example. The base module 31 typically has the module number 0. Moreover, the four modules 32, 33, 70, 71 have the module numbers 1, 2, 3 and 4. One or more further subscribers can be connected to the bus 14 between the coordinator 13 and the first subscriber 11. For example, the coordinator 13 can be coupled with the first subscriber 11 via the first signal line 17 and one or more additional subscribers and one or more additional signal lines. For example, a third and a fourth subscriber 72, 73 are connected to the bus 14.

Since the subscriber that is connected to the bus 14 closest to the coordinator 13 typically receives the number 1 as a subscriber address, in FIG. 2, the third subscriber 72 has the subscriber address 1, the fourth subscriber 73 has the subscriber address 2, and the first subscriber 11 has the subscriber address 3. The subscriber address of the second subscriber 12 is calculated by the coordinator 13 from the subscriber address of the first subscriber 11 plus N+1. Since the first number N has the value 4 here, the second subscriber address of the second subscriber 12 is thus 3+4+1=8. The first subscriber 11 can also be referred to as a modular sub-bus subscriber. Slot numbers in the modular fieldbus subscriber become sub-bus subscriber addresses and, optionally, also slot numbers of a sub-bus subscriber, and vice versa. The coordinator 13 carries out a special operation: Fieldbus slots 3 to 7 are mapped to bus slots 3.0 to 3.4.

In another embodiment, the bus 14 can include additional subscribers. For example, an additional subscriber can also include more than one module, such as a second number M of modules. The number of modules of the different subscribers can be different here. The number of modules and subscribers can be limited by the number of available slot numbers.

Figures 3A, 3B, 4:
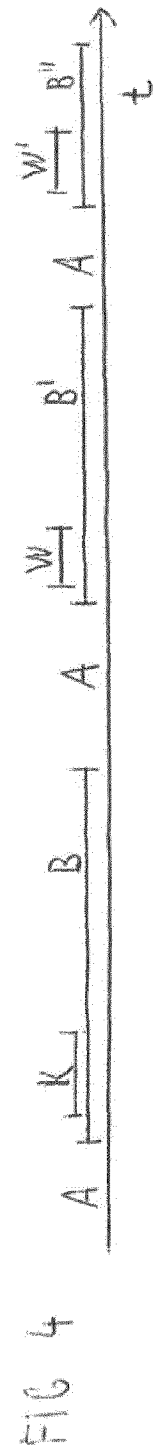
FIGS. 3A and 3B illustrate exemplary embodiments of allocation tables.
FIG. 4 shows an exemplary sequence of phases in a bus arrangement.

FIG. 3A shows an exemplary embodiment of an allocation table that the coordinator 13 of the bus arrangement 10 shown in FIG. 1 can use. The coordinator 13 stores the allocation table in the memory 53.

FIG. 3B shows an exemplary embodiment of an allocation table used by the coordinator 13 of the bus arrangement 10 shown in FIG. 2.

FIG. 4 shows an exemplary embodiment of the chronological sequence of the phases, which are plotted over a time t. The configuration phase K is carried out at the beginning of an operating phase B. After the coordination phase K has been carried out, regular operation of the bus arrangement 10 takes place in the operating phase B, for example. After the operating phase B, there is a shut-down phase A. In the shut-down phase A, the coordinator 13 and the subscribers 11, 12 are not supplied with electric power. The shut-down phase A is followed by another operating phase B'. At the beginning of the additional operating phase B', a restart phase W is carried out. After the restart phase W, the regular operation of the bus arrangement 10 takes place in the additional operating phase B'. The additional operating phase B' can be followed by additional shut-down phases A and additional operating phases B". In the shut-down phases A, the subscribers 11, 12 do not store subscriber addresses. In the restart phase W, the coordinator 13 carries out the same steps in order to assign the subscriber addresses to the subscribers 11, 12, as in the configuration phase K.

In the configuration phase K as well as in the restart phase W, the subscribers 11, 12 are successively addressed via the coordinator 13 and with the aid of the daisy chain beginning with the subscriber 11 closest to the coordinator 13, and the geographical positions and thus the order of the subscribers 11, 12 are set. In the example shown in FIG. 1, the coordinator 13 activates the first subscriber 11 via the first signal line 17. After activation, the coordinator 13 sends a bus telegram containing a first subscriber address, such as 1, to all subscribers 11, 12 via the first and the second bus line 21, 22. Only the activated subscriber, namely the first subscriber 11, incorporates the first subscriber address contained in the bus telegram into its first volatile memory 54. The bus telegrams are embodied as a broadcast. From this point forward, the first subscriber 11 can receive bus telegrams with the previously received subscriber address. For example, the first subscriber 11 can store the first number N in the first volatile or first nonvolatile memory 54, 55. The coordinator 13 queries the first number N of modules at the first subscriber 11 and stores the first number N in the memory 53 together with the first subscriber address.

In an additional step of the configuration phase K, the coordinator 13 sends a bus telegram to all subscribers that contains the first subscriber address and the command to activate the output-side signal line, i.e. the second signal line 18. The first subscriber 11 detects by means of its transceiver 25 that it is being addressed and activates the second subscriber 12 via a signal on the second signal line 18. Subsequently, the coordinator 13 transmits a bus telegram to all subscribers 11, 12 that contains the second subscriber address, e.g. 4. However, since only the second subscriber 12 is activated, only the second subscriber 12 incorporates the second subscriber address into its volatile memory 56. As an additional step in the configuration phase K, the coordinator 13 causes the second subscriber 12 to report the second number M of modules. The second subscriber 12 consists exclusively of a base module, for example, and responds by stating that the second number M has the value 0. The coordinator 13 registers the second number M together with the second subscriber address in the memory 53. The addressing is carried out by the coordinator 13 until all subscribers have been assigned a subscriber address. Upon completion of the configuration phase K, the coordinator 13 is configured such that it can address all subscribers 11, 12 via the subscriber addresses and module numbers.

An operator can also reset the bus assembly 10 by means of a switch of the coordinator 13, for example, so that the bus assembly 10 starts again with an operating phase B, which has a configuration phase K.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference signs:
10 bus arrangement
11 first subscriber
12 second subscriber
13 coordinator
14 bus
15, 16 processor core
17 first signal line
18 second signal line
19 third signal line
20 processor core
21 at least one bus line
22 additional bus line
23 first bus terminal
24, 25, 26 transceiver
27 power supply line
28, 29, 30 power supply
31 base module
32, 33 module
34, 35, 36 functional unit
37, 38, 39 signal line circuit
40 microcontroller
41 additional functional unit
42 reference potential line
43 module bus
45, 46, 47 integrated circuit
50 oscillator
51 additional memory
52 volatile memory
53 memory
54 first volatile memory
55 first nonvolatile memory
56 second volatile memory
57 second nonvolatile memory
58 additional transceiver
59 second bus terminal
60 fieldbus
61 controller
70, 71 module
72 third subscriber
73 fourth subscriber
10A shut-down phase
B, B', B" operating phase
K configuration phase
t time
W, W' restart phase

The invention claimed is:

1. A bus arrangement, comprising:
a first subscriber comprising a base module and a first number N of modules;
a second subscriber;
a coordinator comprising a first bus terminal and a second bus terminal; and
a bus that couples the first bus terminal with the first subscriber and the second subscriber,
wherein the coordinator is configured such that, in a configuration phase, it sends the first subscriber a first bus telegram for requesting information, the first subscriber being configured to transmit the first number N to the coordinator,
wherein the coordinator is configured to receive a fieldbus telegram via the second bus terminal and to convert the field bus telegram into a second bus telegram that is directed to the base module or to a module from the first number N of modules and to transmit the second bus telegram via the first bus terminal,
wherein the first subscriber has a first subscriber address, the first number N of modules has a first number N of module numbers, the base module has an additional module number, and the second subscriber has a second subscriber address, and
wherein the coordinator comprises a memory and is configured to identify a slot number from the fieldbus telegram, to determine the first subscriber address and the module number using the slot number and the information stored in the memory, and to direct the first bus telegram to the first subscriber address and the module number.

2. The bus arrangement according to claim 1, wherein the coordinator is configured to output a second fieldbus telegram via the second bus terminal, which comprises a slot number and data made available by one of the modules or the base module, and to determine the slot number indicated in the second fieldbus telegram using the information stored in the memory, the first subscriber address, and the module number.

3. The bus arrangement according to claim 1, wherein the base module and each module from the first number of modules each comprises a module configurable functional unit.

4. The bus arrangement according to claim 1, wherein the base module and one module from the first number of modules each comprise a functional unit from a group that includes an actuator, switchgear, a device controller, a device commander, a signaler, a controller, a frequency converter, a meter, and a sensor.

5. The bus arrangement according to claim 1,
wherein the bus comprises a first signal line that couples the first subscriber and the coordinator and at least one bus line that connects the coordinator to the first subscriber and the second subscriber,
wherein the coordinator is configured to activate the first subscriber via the first signal line during the configuration phase and to transmit the first bus telegram containing a first subscriber address via the at least one bus line, and
wherein the first subscriber is configured to store the first subscriber address in a first volatile memory of the first subscriber.

6. The bus arrangement according to claim 1, wherein the coordinator is configured such that, in the configuration phase, it communicates a first subscriber address to the first subscriber and a second subscriber address to the second subscriber, and it determines the second subscriber address according to the following rule:
the second subscriber address > the first subscriber address + N,
where N is the first number of modules.

7. The bus arrangement according to claim 5, wherein the bus comprises a second signal line that connects the second subscriber to the first subscriber, wherein the first subscriber is configured such that, in the configuration phase, it activates the second subscriber via the second signal line, wherein the coordinator is configured to transmit at least one bus telegram containing the second subscriber address to the first subscriber and the second subscriber via the at least one bus line, and wherein the second subscriber is configured to store the second subscriber address in a second volatile memory of the second subscriber.

8. A method for operating a bus arrangement, the bus arrangement comprising: a first subscriber comprising a base module and a first number N of modules; a second subscriber; a coordinator comprising a first bus terminal and a second bus terminal; and a bus that couples the first bus terminal with the first subscriber and the second subscriber, the method comprising:

receiving a fieldbus telegram by the coordinator via the second bus terminal of the coordinator; and converting the fieldbus telegram into a bus telegram by the coordinator and transmitting the bus telegram via the first bus terminal of the coordinator, wherein the coordinator directs the bus telegram to the base module or a module of the first number N of modules, wherein the coordinator, in a configuration mode, sends the first subscriber another bus telegram for requesting information, and wherein the coordinator receives the first number N from the first subscriber, wherein the first subscriber has a first subscriber address, the first number N of modules has a first number N of module numbers, the base module has an additional module number, and the second subscriber has a second subscriber address, and wherein the coordinator comprises a memory and is configured to identify a slot number from the fieldbus telegram, to determine the first subscriber address and the module number using the slot number and the information stored in the memory, and to direct the first bus telegram to the first subscriber address and the module number.

9. A bus arrangement, comprising:

a first subscriber comprising a base module and a first number N of modules;

a second subscriber;

a coordinator comprising a first bus terminal and a second bus terminal; and a bus that couples the first bus terminal with the first subscriber and the second subscriber, wherein the coordinator is configured such that, in a configuration phase, it sends the first subscriber a first bus telegram for requesting information, the first subscriber being configured to transmit the first number N to the coordinator, wherein the coordinator is configured to receive a fieldbus telegram via the second bus terminal and to convert the field bus telegram into a second bus telegram that is directed to the base module or to a module from the first number N of modules and to transmit the second bus telegram via the first bus terminal, and wherein the coordinator is configured such that, in the configuration phase, it communicates a first subscriber address to the first subscriber and a second subscriber address to the second subscriber, and it determines the second subscriber address according to the following rule:

the second subscriber address >the first subscriber address +N, where N is the first number of modules.

* * * * *